US009822930B2

(12) United States Patent
Williams et al.

(10) Patent No.: US 9,822,930 B2
(45) Date of Patent: Nov. 21, 2017

(54) PROTECTION STRUCTURE FOR GAS CYLINDER AND VALVE REPLACEMENT

(71) Applicants: Mark Sherman Williams, Hamshire (GB); Gareth Ross Pemberton, Worcester (GB); Csaba Alfoldi, Brussels (BE)

(72) Inventors: Mark Sherman Williams, Hamshire (GB); Gareth Ross Pemberton, Worcester (GB); Csaba Alfoldi, Brussels (BE)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/910,185

(22) PCT Filed: Aug. 1, 2014

(86) PCT No.: PCT/EP2014/066654
§ 371 (c)(1),
(2) Date: Feb. 4, 2016

(87) PCT Pub. No.: WO2015/018766
PCT Pub. Date: Feb. 12, 2015

(65) Prior Publication Data
US 2016/0161060 A1 Jun. 9, 2016

(30) Foreign Application Priority Data
Aug. 6, 2013 (EP) .................................... 13179493

(51) Int. Cl.
*E03B 1/00* (2006.01)
*F17C 13/04* (2006.01)
*F17C 13/06* (2006.01)

(52) U.S. Cl.
CPC .............. *F17C 13/04* (2013.01); *F17C 13/06* (2013.01); *F17C 2201/0104* (2013.01);
(Continued)

(58) Field of Classification Search
CPC .............. F17C 2205/0308; F17C 13/06; F17C 2205/0305; F17C 13/12; Y10T 137/7062
(Continued)

(56) References Cited

U.S. PATENT DOCUMENTS 4,880,134 A * 11/1989 Wood, Jr. ................ F17C 13/06
137/382
5,261,559 A 11/1993 Salvucci
(Continued)

FOREIGN PATENT DOCUMENTS

CN 2122307 11/1992
CN 2157391 2/1994
(Continued)

OTHER PUBLICATIONS

European Patent Office, International Search Report of the International Searching Authority, dated Jul. 10, 2014, for PCT/EP2014/066654.

*Primary Examiner* — Shawn M Braden
(74) *Attorney, Agent, or Firm* — Larry S. Zelson

(57) ABSTRACT

There is provided a protection structure for a gas cylinder assembly comprising a gas cylinder body and a valve. The gas cylinder body includes a base and a neck to which a proximal end of the valve is connectable in use. The protection structure comprises first and second structural sections, the first section being connectable to the valve such that the second section is spaced from the valve by the first section. Further, in use, the second section is arranged to transfer impact forces to the first section, and the second section is arranged to deform with respect to the second
(Continued)

section in response to said impact forces to reduce the peak impact force on the valve.

17 Claims, 7 Drawing Sheets

(52) U.S. Cl.
  CPC  *F17C 2201/0109* (2013.01); *F17C 2201/032* (2013.01); *F17C 2201/056* (2013.01); *F17C 2201/058* (2013.01); *F17C 2203/0617* (2013.01); *F17C 2203/0619* (2013.01); *F17C 2203/0639* (2013.01); *F17C 2203/0646* (2013.01); *F17C 2203/0663* (2013.01); *F17C 2205/0165* (2013.01); *F17C 2205/0308* (2013.01); *F17C 2205/0323* (2013.01); *F17C 2205/0329* (2013.01); *F17C 2205/0338* (2013.01); *F17C 2205/0385* (2013.01); *F17C 2205/0394* (2013.01); *F17C 2221/011* (2013.01); *F17C 2221/012* (2013.01); *F17C 2221/014* (2013.01); *F17C 2221/015* (2013.01); *F17C 2221/016* (2013.01); *F17C 2221/033* (2013.01); *F17C 2223/0123* (2013.01); *F17C 2223/036* (2013.01); *F17C 2270/0745* (2013.01); *Y02E 60/321* (2013.01)

(58) Field of Classification Search
  USPC ......................................................... 137/382
  See application file for complete search history.

(56) References Cited

U.S. PATENT DOCUMENTS

| | | | | |
|---|---|---|---|---|
| 5,505,226 | A * | 4/1996 | Breth | F16K 27/08 |
| | | | | 137/377 |
| 6,311,722 | B1 * | 11/2001 | Gounot | F17C 13/06 |
| | | | | 137/377 |
| 6,415,946 | B2 * | 7/2002 | Carlo | F17C 13/04 |
| | | | | 220/724 |
| 6,910,602 | B2 * | 6/2005 | Hasaka | F17C 13/04 |
| | | | | 222/189.1 |
| 2009/0014453 | A1 * | 1/2009 | Bleys | F17C 1/14 |
| | | | | 220/581 |
| 2009/0038691 | A1 * | 2/2009 | Birch | F16K 1/307 |
| | | | | 137/382 |
| 2010/0012663 | A1 * | 1/2010 | Andreani | F17C 13/06 |
| | | | | 220/582 |
| 2011/0278316 | A1 | 11/2011 | Herzer | |
| 2015/0083237 | A1 * | 3/2015 | Ligonesche | F17C 13/002 |
| | | | | 137/382 |
| 2015/0167896 | A1 * | 6/2015 | Frenal | F17C 13/06 |
| | | | | 53/468 |

FOREIGN PATENT DOCUMENTS

| | | | | |
|---|---|---|---|---|
| CN | 101438092 | | 5/2009 | |
| EP | 747796 | A1 | 10/2001 | |
| FR | 2803366 | A1 * | 7/2001 | ............. F17C 13/06 |
| JP | H05133500 | | 5/1993 | |
| WO | 2007049068 | A1 | 5/2007 | |

* cited by examiner

PROTECTION STRUCTURE FOR GAS CYLINDER AND VALVE REPLACEMENT

The present invention relates a protection structure for a gas cylinder and valve arrangement. More particularly, the present invention relates to a protection structure for attachment to a valve of a gas cylinder assembly which is operable to protect the valve mechanism from catastrophic damage as a result of an impact scenario.

A compressed gas cylinder is a pressure vessel designed to contain gases at high pressures, i.e. at pressures significantly greater than atmospheric pressure. Compressed gas cylinders are used in a wide range of markets, from the low cost general industrial market, through the medical market, to higher cost applications, such as electronics manufacture utilising high purity corrosive, toxic or pyrophoric speciality gases. Many applications for which gas cylinders are used involve the provision of purified permanent gases. Non-exhaustive examples of such gases may be: Oxygen, Nitrogen, Argon, Helium, Hydrogen, Methane, Nitrogen Trifluoride, Carbon Monoxide, Krypton or Neon.

Commonly, pressurised gas containers comprise steel, aluminium or composites and are capable of storing compressed, liquefied or dissolved gases with a maximum filling pressure up to 450 bar g for most gases, and up to 900 bar g for gases such as hydrogen and helium. Such high storage pressures are potentially hazardous, and cylinders are required to meet stringent safety standards and, of course, require careful handling by the end user.

In order to dispense gases effectively and controllably from a gas cylinder or other pressure vessel, a regulator or valve assembly is required. A valve provides a mechanism by which the flow of gas can be controlled. A regulator is able to regulate the flow of the gas such that the gas is dispensed at a constant, or user variable, pressure.

FIG. 1 shows a schematic view of a gas cylinder assembly 10. The gas cylinder assembly 10 comprises a gas cylinder 12 having a gas cylinder body 14 and a valve 16.

The gas cylinder body 14 comprises a generally cylindrical container having a flat base 18 arranged to enable the gas cylinder 12 to stand unsupported on a flat surface.

The gas cylinder body 14 is formed from steel, aluminium and/or composite materials and is adapted and arranged to withstand internal pressures up to approximately 900 bar g. A neck 20 which defines an aperture 20a is located opposite to the base 18 and comprises a screw thread (not shown) adapted to receive the valve 16.

The gas cylinder body 14 and valve 16 define a pressure vessel (in this embodiment, in the form of the gas cylinder 12) having an internal volume. The valve 16 comprises a housing 22, an outlet 24, a valve body 26 and a valve seat 28. The housing 22 comprises a complementary screw thread for engagement with the aperture 20 of the gas cylinder body 14. The outlet 24 is adapted and arranged to enable the gas cylinder 12 to be connected to other components in a gas assembly; for example, hoses, pipes, or further pressure valves or regulators. The valve 16 may, for example, comprise a VIPR (Valve with Integrated Pressure Regulator).

The valve body 26 can be axially adjusted towards or away from the valve seat 28 by means of rotation of a graspable handle 30 selectively to open or to close the outlet 24. In other words, movement of the valve body 26 towards or away from the valve seat 28 selectively controls the area of the communication passageway between the interior of the gas cylinder body 14 and the outlet 24. This, in turn, controls the flow of gas from the interior of the gas cylinder 12 to the external environment.

The very high pressures under which gases are stored in gas cylinders present a number of potential safety hazards. The need to safely contain gas under these conditions often requires robust and rigid gas cylinder structures. In addition, the valve itself needs to be structurally rigid to prevent leaks, and the connection to the cylinder body must be sufficiently robust.

However, these measures often result in a gas cylinder assembly which is very heavy. Consequently, damage to the cylinder and valve assembly is a real risk if the gas cylinder assembly is dropped onto a surface; for example, from a lorry whilst loading or unloading.

Of particular vulnerability is the gas valve and connection of the valve to the cylinder body. As shown in FIG. 1, the gas valve 16 protrudes from gas cylinder body 14 by a distance d which may, depending upon the application, be in the range of 15-40 cm.

This, coupled with the generally high weight of the gas cylinder assembly 10 and high pressure gaseous contents, potentially creates a large moment on the gas valve body 22 and connection should a cylinder 14 be dropped and impact a ground surface in the region the valve 16. The high resulting moment may damage a valve 16 irreparably or, even worse, the valve 16 may leak or be sheared from the cylinder body entirely. The resulting leak of high pressure gas may have serious consequences for equipment and personnel local to the gas cylinder should such damage occur. Thus protection of the valve mechanism is critical for the gas cylinder assembly to be safe and approved for sale, as required by the standard BS EN ISO 11117:2008.

It is known to protect a valve with a metallic guard. Such metallic guards are fitted over the top of the cylinder valve and gas cylinder to protect the valve region. However, whilst these arrangements may provide the necessary protection, the need to use metal as the material for the guard imposes limits on the structural form and construction that the guard can take. In addition, the cost of the manufacture of such guards can be high.

Plastic guards are also used for industrial gas cylinders. They are used in particular situations, for example, with integrated valves where the form requirements are more complex. However, plastic guards are only widely employed on small cylinders up to 10 liters where the weight of the cylinder and contents is relatively low and so the relatively low strength plastic guard can meet the necessary safety requirements.

Certain types of plastic guard are also used for cylinders of up to 30 liters. However, the wall thickness of the plastic required to maintain the integrity of the gas cylinder package becomes close to the limits of injection moulding techniques in this strength range and so larger cylinders cannot be protected using known plastic guards.

Gas cylinder products upwards of 20 liters are of significant weight for a single person to manoeuvre, commonly weighing more than 40 kgs. Metallic guards are often limited in their form to assist with good ergonomic movement and manual access to the cylinder. As discussed, plastic guards offer greater design freedom but cannot meet the necessary safety requirements for larger cylinder products.

Therefore, there exists in the art a technical problem that cylinder guards for larger or heavier cylinders are limited in terms of the materials and physical forms that they can take. As a result, there is a need in the art for an improved cylinder guard which is operable to provide the sufficient strength and protection required to ensure the safe handling of the gas cylinder whilst allowing greater design freedom for the guard materials and form factors.

According to a first aspect of the present invention, there is provided a protection structure for a gas cylinder assembly comprising a gas cylinder body and a valve, the gas cylinder body including a base and a neck to which a proximal end of the valve is connectable in use, the protection structure comprising first and second structural sections, the first section being connectable to the valve such that the second section is spaced from the valve by the first section, wherein, in use, the second section is arranged to transfer impact forces to the first section, and the first section is arranged to deform with respect to the second section in response to said impact forces to reduce the peak impact force on the valve.

By providing such an arrangement, a protection structure can be connected to a valve which is operable to transfer and absorb much of the shock of an inadvertent impact of a gas cylinder on a surface. The provision of a "crumple zone" in the form of the first section which is arranged to deform in response to impact forces reduces the instantaneous force experienced by the valve. This enables efficient protection of the valve and reduces the risk of valve failure, cylinder breach or other catastrophic damage to the cylinder without the need to provide bulky and costly metal surrounds enclosing the whole of the valve assembly.

In other words, the protection structure is operable to function as an energy absorbing device to be attached to a cylinder valve. The protection structure comprises a collapsible part fixed to a load transferring part such that an impact is transferred into the collapsible part to dissipate energy and reduce the maximum force experienced by the valve.

In one embodiment, the first and second sections arranged in a stacked configuration at a distal end of the valve such that, in use, the first section is located directly between the second section and the valve.

In one embodiment, first section comprises a tapered section.

In one embodiment, the second section is substantially cylindrical.

In one embodiment, the first and second sections are connected by mating flanges.

In one embodiment, at least one of the first and second sections is formed from mild steel. In one embodiment, the first and second sections are formed from annealed mild steel.

In one embodiment, the second section is formed from a thicker or harder material than the first section.

In one embodiment, the second section is formed from thicker material than the first section, the material having a yield stress in the range of 100-250 MPa.

According to a second aspect of the present invention, there is provided a guard structure comprising a guard body and the protection structure of the first aspect, the guard body being arranged, in use, to surround the valve and protection structure, at least a portion of the guard body being supported by the protection structure.

In one embodiment, the guard body comprises first and second clamshell portions arranged to connect directly to the protection structure.

In one embodiment, portions of the first and second clamshell portions are arranged to engage conformally with the first and second sections of the protection structure.

In one embodiment, the guard body further comprises a rotatable cap locatable to secure the first and second clamshell portions to the protection structure.

In one embodiment, the rotatable cap is connected by a releasable connection. In one embodiment, the releasable connection is a push fit connection. In one embodiment, the rotatable cap is rotatable about a longitudinal axis of the gas cylinder assembly.

In one embodiment, the guard body is formed from a plastics material. In one embodiment, the guard body is formed by injection moulding.

In one embodiment, the guard body comprises a dependent lip extending around substantially the entire perimeter of the guard body, the dependent lip being located and arranged to be graspable by at least one user to enable the gas cylinder assembly to be lifted and/or manoeuvred.

According to a third aspect of the present invention, there is provided a valve assembly comprising a proximal end connectable to a gas cylinder and a distal end comprising a protection structure according to the first aspect and/or a guard structure according to the second aspect.

In one embodiment, the valve assembly comprises a regulator.

In one embodiment, the valve assembly comprises a valve with integrated pressure regulator.

In one embodiment, the valve assembly comprises a substantially planar distal end operable to receive the protection structure of the first aspect.

In one embodiment, the protection structure is connected to the distal end of the valve assembly by removable or permanent fixings. In one embodiment, the removable fixings comprise bolts.

According to a fourth aspect of the present invention, there is provided a gas cylinder assembly comprising a gas cylinder body and a valve assembly according to the third aspect.

In one embodiment, the gas cylinder body has an internal volume in the region of 20 to 50 liters. In one embodiment, the gas cylinder body has an internal volume of approximately 50 liters. In one embodiment, the gas cylinder assembly has a weight in the range of 80 to 120 kgs. In one embodiment, the gas cylinder assembly weighs approximately 100 kgs.

According to a fifth aspect of the present invention, there is provided a method of providing an impact structure for a valve assembly forming part of a gas cylinder assembly, the valve assembly being, in use, connected to a gas cylinder body, the method comprising the steps of: providing a protection structure comprising first and second structural sections; and connecting the first section to the valve such that the second section is spaced from the valve by the first section, wherein the protection structure being adapted and arranged such that the second section is arranged to transfer impact forces to the first section, and the first section is arranged to deform with respect to the second section in response to said impact forces to reduce the peak impact force on the valve.

According to an embodiment, there is provided a guard structure for a gas cylinder assembly, the gas cylinder assembly comprising a gas cylinder body and a valve, the gas cylinder body including a base and a neck to which a proximal end of the valve is connected in use, the guard structure being securable to the gas cylinder assembly and comprising a guard body arranged, in use, to surround the valve, wherein the guard body further comprises a dependent lip extending around substantially the entire perimeter of the guard body, the dependent lip being located and arranged to be graspable by at least one user to enable the gas cylinder assembly to be lifted and/or manoeuvred.

In one embodiment, the dependent lip extends continuously around the perimeter of the guard body.

In one embodiment, the dependent lip is located at a lower end of the guard structure.

In one embodiment, the guard body is formed from a plastics material.

In one embodiment, the dependent lip is downwardly-dependent.

In one embodiment, the dependent lip is integrally formed with the guard body.

In one embodiment, the dependent lip is arranged, in use, to be located adjacent the neck of the gas cylinder body when the guard structure is located on the gas cylinder assembly.

In one embodiment, the guard body comprises first and second clamshell portions. In one embodiment, portions of the first and second clamshell portions are arranged to engage conformally with a structure attached to the valve assembly.

In one embodiment, the guard body further comprises a rotatable cap locatable to secure the first and second clamshell portions to said structure.

In one embodiment, the rotatable cap is connected by a releasable connection. In one embodiment, the releasable connection is a push fit connection. In one embodiment, the rotatable cap is rotatable about a longitudinal axis of the gas cylinder assembly.

In one embodiment, the guard body is formed by injection moulding.

Embodiments of the present invention will now be described in detail with reference to the accompanying drawings, in which.

The present invention relates to an energy absorbing protection structure fitted to a valve of a gas cylinder package. The protection structure enables the management of the energy experienced by a cylinder package during an impact scenario. In the majority of applications the protection structure is designed to fit onto the cylinder valve and interface with the guard itself. If the package is then struck with significant force, such as falling off the back of a lorry, then the energy absorber acts to manage the both the maximum peak force seen in the valve and the amount of energy the valve is required to dissipate.

Figure 1:
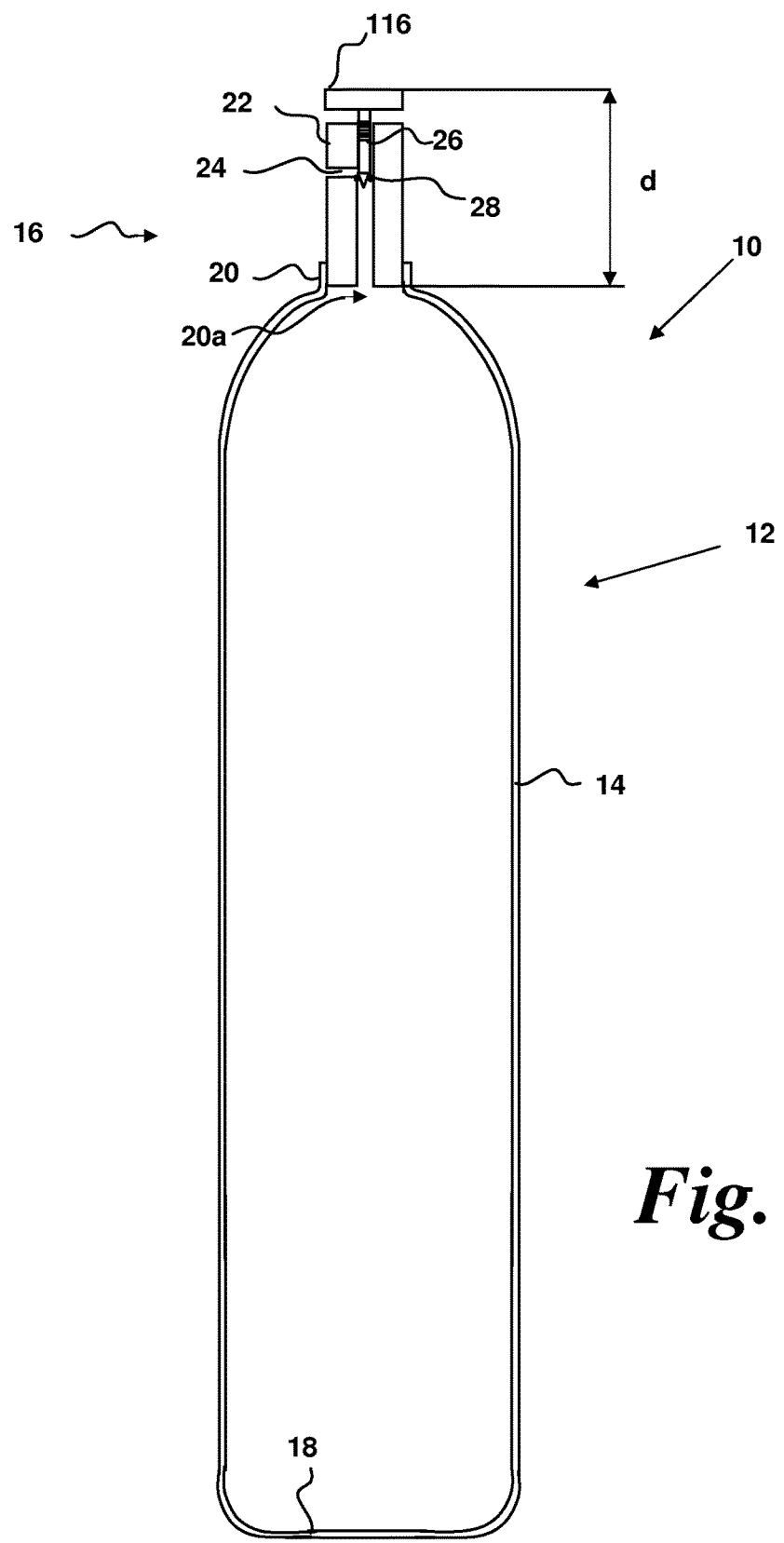
FIG. 1 is a schematic diagram of a gas cylinder and valve assembly.
Figure 2:
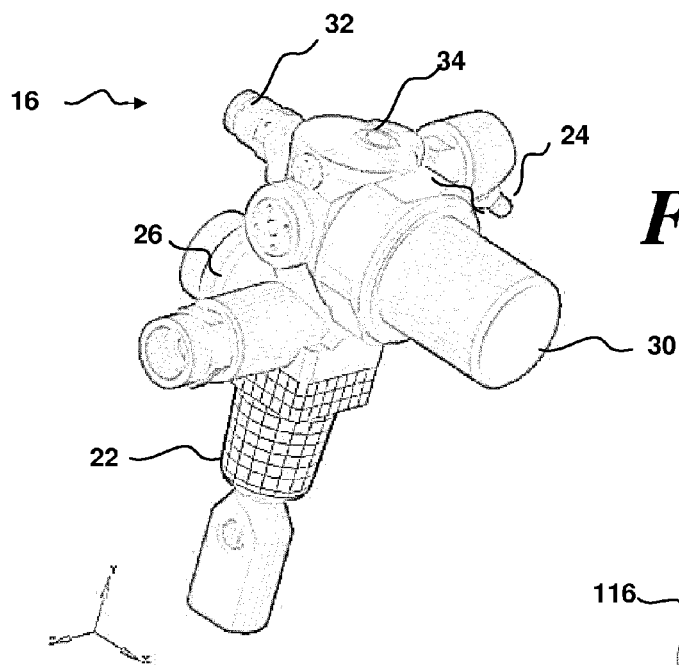
FIG. 2 is a perspective view of a valve assembly and regulator suitable for use with aspects of the present invention.

FIG. 2 shows a perspective view of a valve 16 for use with the present invention. In this example, and in addition to the features described with reference to the example of FIG. 1, the valve 16 comprises an integrated pressure regulator 30 and a fill port 32 to enable filling of a gas cylinder. Non-exhaustive examples of suitable regulators may be single or double diaphragm regulators. However, the skilled person would be readily aware of variations that could be used with the present invention.

The regulator 30 is operable to receive gas from the interior of the gas cylinder 12 at full cylinder pressure (e.g. 100 bar), but to deliver gas at a substantially constant fixed low pressure (e.g. 5 bar) to the outlet 24. This is achieved by a feedback mechanism whereby a poppet valve, operable to translate towards and away from a valve seat, is connected to a diaphragm. The pressure of gas downstream of the valve is operable to act on the diaphragm in opposition to the biasing force of a spring. A graspable handle (shown in FIGS. 7 and 10) is provided to enable a user to adjust the biasing force of the spring, thereby moving the position of the diaphragm and, as a result, adjusting the equilibrium spacing between the poppet valve and the valve seat. This enables adjustment of the dimensions of the aperture through which the high pressure gas flow from the outlet 24 can pass, and so allows the output pressure to be set.

In this example, the outlet 24 comprises a quick connect orifice. An upper surface 34 of the valve 16 is arranged to receive the protection structure 100 of an embodiment of the invention as will be described later. The surface 34 of the valve 16 is arranged at a distal end of the valve 16 remote from the connection to the gas cylinder 14 and, when the valve 16 is attached to an upright gas cylinder, will form the top surface of the gas cylinder assembly 10. The surface 34 is substantially planar to enable elements to be fitted easily and securely.

Figure 3:
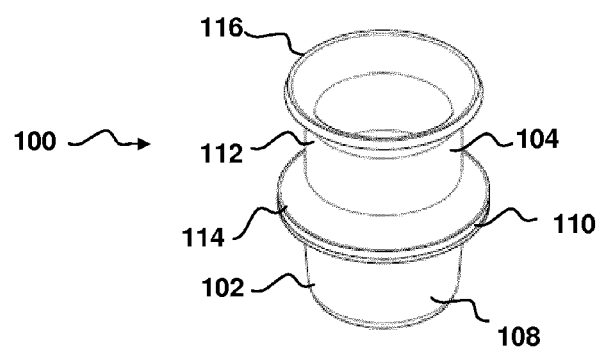
FIG. 3 is a perspective view of a protection structure according to an embodiment of the present invention.
Figure 4:
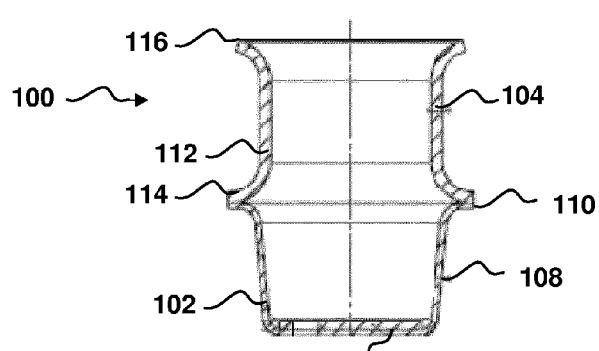
FIG. 4 is a cross section taken along a vertical plane through the protection structure of FIG. 3.

FIGS. 3 and 4 show a protection structure 100 according to an embodiment of the present invention. In FIGS. 3 and 4, the protection structure 100 is shown separate from the valve 16. The protection structure 100 comprises first and second sections 102, 104. The first section 102 comprises a base 106, a tapered cylindrical section 108 and a first flange 110. The base 106 is arranged to connect to the upper surface 34 of the valve 16 (as shown in FIGS. 5 to 7 and 10) in use as will be described later.

The second section 104 comprises a cylindrical centre section 112 tapering outwards at either end to form second and third flanges 114, 116. The second section 104 is connected to the first section 102 by connection of the first and second flanges 110, 114. This may be achieved through numerous means. Mechanical fastenings such as bolts or screws or a bracket may be used. However, it is preferred that permanent attachment techniques are utilised to prevent variations in tolerances and to ensure durability of the protection structure 100. Such attachment techniques may include brazing, welding, rivoting, spacer welding or gluing.

In one embodiment, the first and second sections 102, 104 of the protection structure 100 are formed from work hardened mild steel. The first and second sections 102, 104 are formed through stamping, pressing or spinning blank material to form the desired shape. Whilst work hardening can be achieved simply as a by-product the above manufacturing processes, the amount of hardening is not well defined and varies depending upon the process used.

Therefore, to ensure consistency of material structure, annealing is carried out subsequent to formation of the first and second sections 102, 104 to manage further the material characteristics and prevent inadvertent local hardening of, for example, the second section 104 which may reduce the protection capabilities of the protection structure 100.

However, other treatment processes or work hardening processes may be used. Further, whilst the present embodiment is described with reference to mild steel, the skilled person would readily be aware of other materials suitable for use with the present invention. When annealed, it is found that the mild steel used has a material yield stress in the range of 170-250 MPa. However, other materials in the range of 100-250 MPa may also be used, for example aluminium. The yield stress is required to fall within the specified range. If it is too hard or too soft, it will not provide the required protection.

The first and second sections 102, 104 comprise mild steel of different thicknesses. From experimental data, the first section 102 has a thickness of 1.5 mm and a second section 104 has a thickness of 2.64 mm. These dimensions have been found to be optimal for protection of the valve of a 100 kg gas cylinder when the same material is used for both the first and second sections 102, 104. In other words, a thickness ratio of the first section to the second section in the range of 0.5-0.6 is considered desirable for the materials discussed above. However, other dimensions could be used with different materials and different material strengths.

What is desirable is that the first section 102 is operable to deform under a lower load than the second section 102. This may be due to material, structural or geometric properties—for example, this may be due to the reduced strength or hardness of the material of the first section 102 relative to the second section 104. Whilst, in the present embodiment, this is achieved at least in part by provision of a thicker second section 104 when compared to the first section 102, the desired technical effect may be achieved in a different manner.

For example, the second section 104 may have the same or similar material thickness to the first section 102 but be formed from a harder material or a material with a greater resistance to tensile stress. Further, different geometries and structures may be used for the first and second sections 102, 104 to provide the necessary utility. For example, a honeycomb or other reinforcing structure may be used for the second section 104 to provide enhanced rigidity over and above the first section 102.

Nevertheless, the skilled person would be readily aware that, irrespective of the material and/or structural choice for the first and second sections 102, 104, the strength of the first section 102 is required to be selected such that the first section 102 collapses under a lower load than either the second section or the valve 16.

Figure 5:
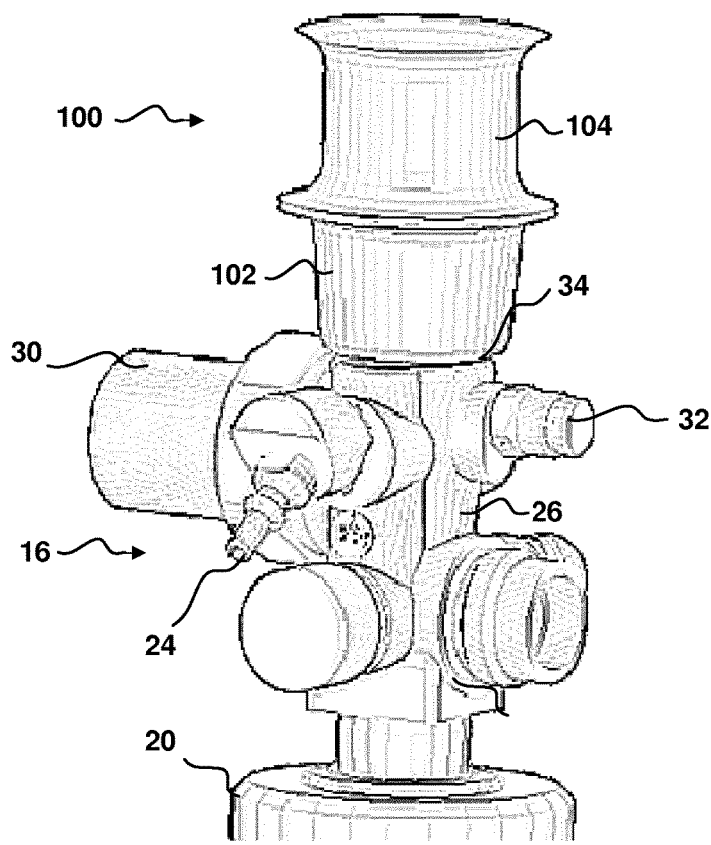
FIG. 5 is a perspective view of the protection structure of FIGS. 3 and 4 connected to the valve of FIG. 2.
Figure 6:
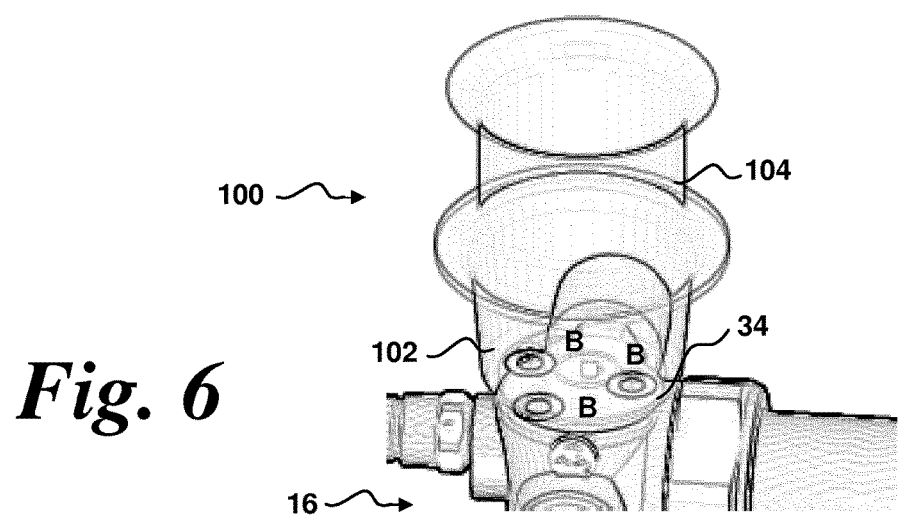
FIG. 6 is a perspective view of protection structure and valve of FIG. 5 with the protection structure shown as transparent to reveal the fixing structure below.
Figure 7:
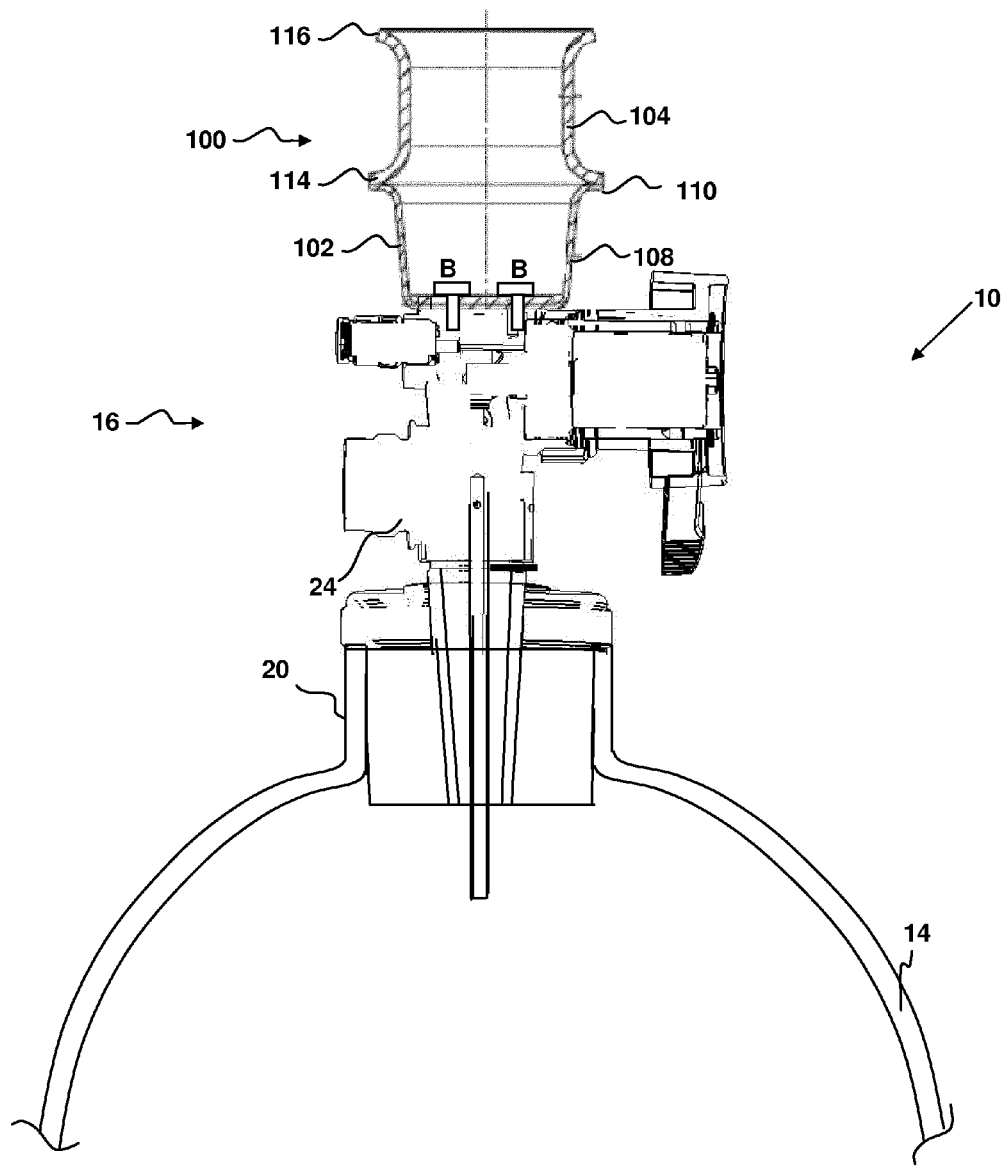
FIG. 7 is a cross section of a gas cylinder assembly incorporating the protection structure of FIGS. 3 to 6 taken along a vertical plane.

FIGS. 5 to 7 show the protection structure 100 connected to the valve 16. FIGS. 5 and 6 show perspective views of the combined arrangement, with FIG. 6 showing the protection structure 100 as transparent to enable the fixing of the components to be shown. FIG. 7 shows a cross section through the arrangement.

As shown, the protection structure 100 is attached to the upper surface 34 of the valve 16 such that the protection structure 100 extends upwardly above the valve 16 and forms the upper end of the gas cylinder assembly 10.

In this embodiment, the first section 102 is connected to the cylinder valve 16 by means of mechanical fastenings such as bolts B. In FIGS. 6 and 7, it can be seen that the protection structure 100 is connected by three M6 bolts. In one embodiment, the protection structure 100 may be spaced from the cylinder valve 16 by washers or other suitable spacers through which the bolts or fasteners may extend.

However, other connection means may be utilised. For example, other mechanical fastenings direct to the valve 16 may be used such as screws. Alternatively, a bracket arrangement may be used to enable ease of removability. As a further alternative, the protection structure 100 may be permanently attached to the valve 100 by welding, brazing or riveting.

Additionally, it may be desirable in certain applications to space the protection structure 100 from the upper end 34 of the valve 16. This may be achieved through use of a washer or spacer between the valve 16 and the protection structure.

In use, the protection structure 100 is arranged to reduce the impact on the cylinder valve 16 should the gas cylinder assembly 10 be dropped inadvertently and land on the valve structure 16, as will be described in detail later.

Therefore, the protection structure 100 is designed to operate in two sections. The first section 102 is made from thinner mild steel than the second section 104. Thus, in response to an impact, the second section 104 is arranged to transfer impact forces through the first section 102. The first section 102 is, concomitantly, arranged to deform in response to the impact forces to absorb the peak impact force resulting from the impact. In other words, the first section 102 is arranged to function as a "crumple zone" between the second section 104 and the valve 16 to spread the impact force over a longer time period and, as a result, reduce the peak impact force on the valve 16.

Figure 8:
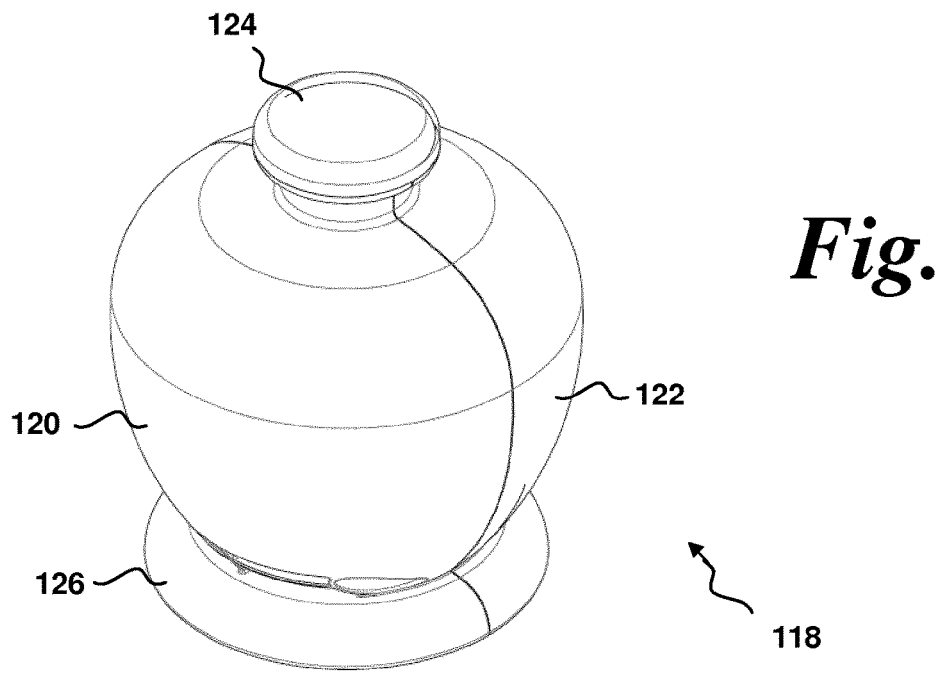
FIG. 8 is a perspective view of a guard arrangement for use with the protection structure of FIGS. 3 to 7.
Figure 9:
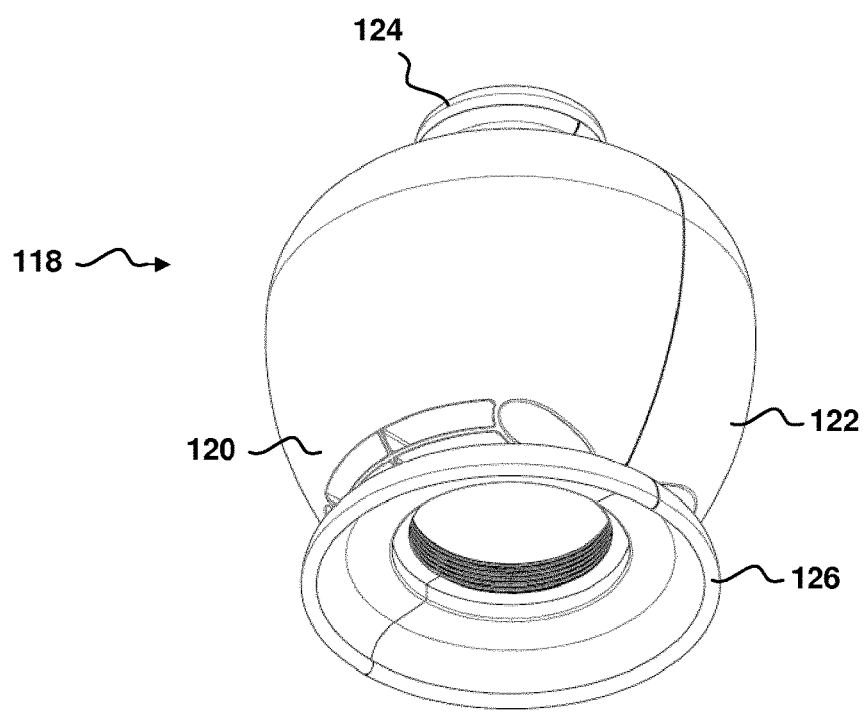
FIG. 9 is an alternative perspective view of the guard arrangement shown in FIG. 8.
Figure 10:
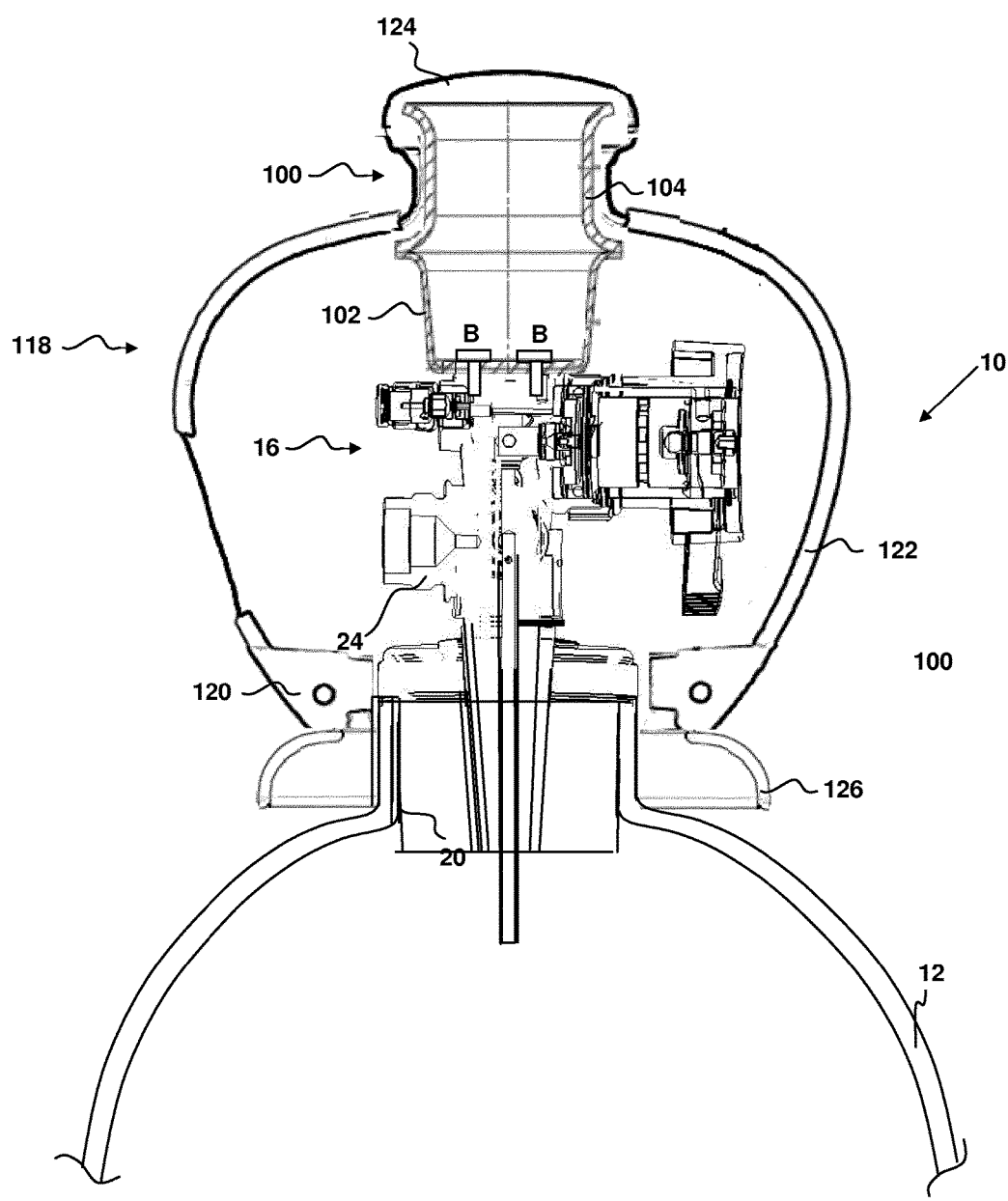
FIG. 10 is a cross section similar to FIG. 7 but showing the guard arrangement of FIGS. 8 and 9 connected to the protection structure and gas cylinder shown in FIG. 7.

With reference to FIGS. 8 to 10, a guard arrangement 118 is provided. FIGS. 8 and 9 show perspective views of the guard 118 in an assembled form removed from the gas cylinder assembly 10. FIG. 10 shows a cross section through a gas cylinder assembly 10 with the guard arrangement 118 fitted in place.

As shown in FIGS. 8 and 9, the guard 118 is formed in three components: first and second housings 120, 122 and a rotatable cap 124. The first and second housings 120, 122 are arranged to form a clamshell structure connected by the rotatable cap 124 at an upper end and by fixing means (such as screws) at a lower end.

When assembled, the first and second housings 120, 122 and the rotatable cap 124 form the guard 118. The guard 118 is substantially elliptical and has a circular cross-section. Provision may be made within the structure of the guard 118 for one or more access ports (not shown). These access ports may include items such as a display, or provide access to the outlet 24, the fill port 32 or the graspable handle to enable operation and selection of gas dispensation modes or pressures.

As shown in FIG. 10, the first and second housings 120, 122 are fitted on either side of the valve 16 and protection structure 100 such that they surround these components. With further reference to FIG. 10, the guard 118 is arranged to interface with the protection structure 100 at an upper end and the protection structure is arranged to support a portion of the guard 118.

The guard arrangement 118 is arranged to surround the valve arrangement 16 and protection structure 100, and provides both structural and environmental protection for the valve 16 and related components. In other words, the guard 118 forms a housing or cover for the valve 16. Further, the guard 118 improves the aesthetic appearance of the cylinder assembly 10 and enables further items to be contained within; for example, an electronic display (arranged to fit in an aperture 120a formed in the first housing 120) or additional electronics or components required for operation of the gas cylinder assembly 10.

Therefore, the guard 118 and protection structure 100 together form an enclosure and surround for the valve 16. However, in contrast to known arrangements, the permanent or semi-permanent attachment of the protection structure 100 to the valve 16 itself permits a greater flexibility in design freedom for the guard 118 whilst still providing the necessary structural rigidity to enable the guard 118 to be fitted to larger cylinders of the order of 100 kgs. In other words, the protection structure 100 forms an integrated part of the valve 16 arranged to connect the guard 118 to the valve 16 and which permits the guard 118 to be used with a wide range of cylinder sizes and weights.

The rotatable cap 124 is connected by means of a push-fit connection to the top of the first and second housings 120, 122 to hold them in place at an upper end. The rotatable cap 124 is arranged to rotate about the longitudinal axis of the gas cylinder 12 and around the upper end of the guard 118 and protection structure 100 so that the cylinder assembly 10, when in an upright position, can be rolled by a user whilst the user holds the rotatable cap 124 with one hand. The fixing means are then used at a lower end of the guard 118 to secure the first and second housings 120, 122 to one another and to the valve 16.

The first and second housings 120, 122 may be made from any suitable material. However, the choice of material is considerably wider than for conventional metallic or thick-plastic guards because the strength and structural integrity requirements of the guard 118 are lower due to the presence of the protection structure 100. Nevertheless, injection moulded plastics material is the preferred material choice due to the ease of manufacture and the range of design freedom. Plastics materials such as ABS or polycarbonate may be used in non-limiting and non-exhaustive examples.

As shown in FIGS. 8 to 10, the guard 118 comprises a skirt 126 which depends from the lower portion of the guard 118 and extends around the base of the guard 118. The skirt 126 forms a dependent lip which is arranged to surround the neck of the gas cylinder 12 and has a curved cross-section when viewed in a vertical plane as shown in FIG. 10.

In this embodiment, the skirt 126 is arranged to be graspable by personnel to facilitate lifting, handling and general manoeuvring of the gas cylinder assembly 10. Conventional gas cylinders are often provided with a handle at an upper end. However, such handles are often only suitable to be grasped by a single user. Given the weight of such cylinders, which may be in excess of 100 kgs, this is often impractical or unsafe. Further, the location of a handle relatively high (e.g. on the top of a cylinder as is known) presents difficulties for a user to attempt to lift the cylinder using such a handle.

In contrast to known arrangements, the skirt 126 is arranged at a lower height (at approximately the neck 20 of the gas cylinder 12 when the valve 16 and guard 118 are installed on the gas cylinder body 14). Further, the skirt 126 extends around the entire circumference of the gas cylinder assembly 10. This permits two users to grasp a gas cylinder assembly 10 irrespective of the rotational orientation of the cylinder assembly 10. In other words, the location and arrangement of the skirt 126 permits straightforward lifting of the gas cylinder assembly 10 by two users stood either side of the gas cylinder assembly 10.

As a yet further benefit, the skirt 126 is permanently attached to the gas cylinder 12 and does not require a separate lifting apparatus such as a removable lifting clamp. This aids in the convenience of manoeuvre of the cylinder 12.

In use, the protection structure 100 and guard 118 are designed to protect the valve arrangement 16 and cylinder 14 from catastrophic and potentially dangerous damage during an impact scenario.

The protection structure 100 was tested using a test method in which a gas cylinder assembly 10 is dropped in a controlled manner from a height of 1.2 m at an angle of 60° to a steel plate supported by concrete base. In this example, a 50 liter gas cylinder 12 is used, the cylinder 12 being filled with water to a weight of 100 kg.

The drop test results were compared with simulated models to optimise the arrangement. To illustrate the operation of the protection device 100, FIGS. 11 and 12 show modelled results of two different impact scenarios.

Figure 11:
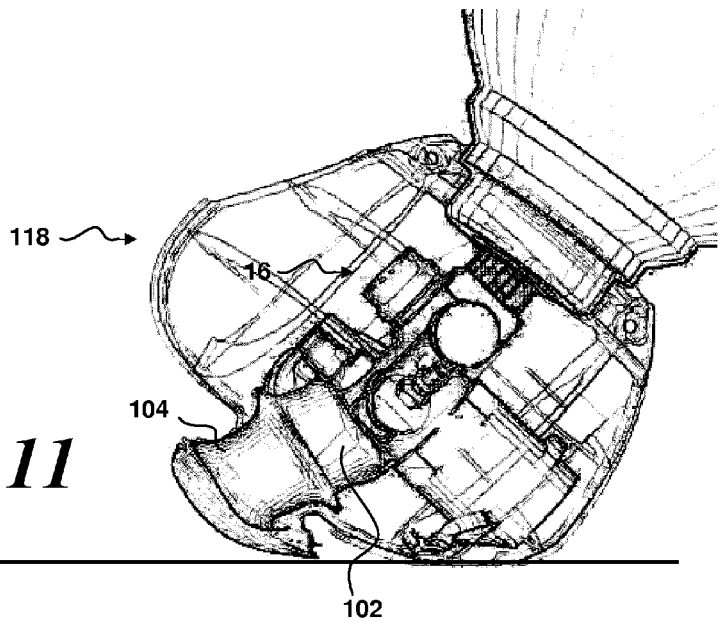
FIG. 11 is a cutaway view showing a simulation of the effect of an impact on a protection structure, guard, valve and gas cylinder body.
Figure 12:
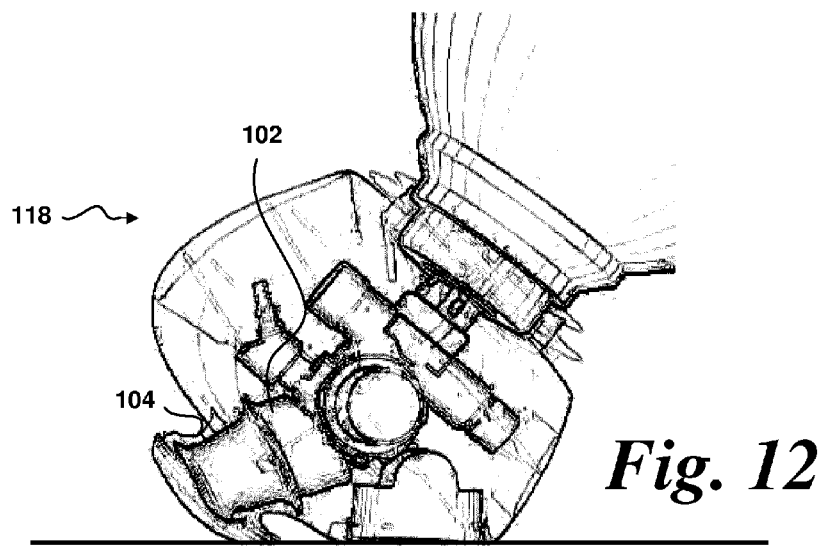
FIG. 12 is a cutaway view similar to FIG. 11 showing a simulation of the effect of an impact on an alternative point of the protection structure, guard, valve and gas cylinder body.

As shown in FIGS. 11 and 12, the impact has resulted in the desired deformation of the first section 102 of the protection structure 100. In contrast, the second section 104 is relatively un-deformed, save for a bending of the third flange 116 upon contact with the impact surface.

Further, and importantly, the valve 16 is only plastically deformed by a relatively small, and safe, amount when compared to a similar impact without a protection structure 100 in place.

In general, and by way of a non-limiting example, a plastic strain of greater than 8% will result in a test fail and a potential failure of the valve. In the example of FIG. 11, the plastic strain on the neck of the valve 16 was reduced to 5.4% from 12.1% by the use of the protection structure 100 and guard 118. In the example of FIG. 12, the plastic strain in the neck of the valve 16 was reduced from 9.6% to 5.8%, thus preventing the valve 16 from being plastically deformed to an unsafe degree.

In addition, the use of the protection structure 100 spreads the impact forces out over a longer time period, reducing the peak shock experienced by the valve. This is one mechanism by which the protection structure 100 protects the valve.

In summary, the present invention provides an energy absorbing device which can be integrated into a valve and guard package such that it forms a permanently or semi-permanently integrated part to connect the guard to the valve. Concomitantly, the costs and ergonomic constraints of the provision of a guard for a larger or heavier cylinder can be reduced when compared to known arrangements.

Furthermore, the arrangement of the present invention enables the design of the energy absorber load transferring section to be used to strengthen locally the guard structure and to enable location and securing of the guard to the valve.

Variations will be apparent to the skilled person would be readily aware of alternatives that would fall within the scope of the present application. For example, whilst the above embodiment has been described with reference to a protection structure, guard and valve assembly, the protection structure and guard may be supplied without the valve and retrofitted to existing valves and cylinders.

Whilst the above embodiment has been described with reference to particular valve and gas cylinder arrangements, it is to be understood that the present invention is applicable to a range of suitable gas cylinder assemblies.

In addition, the protection structure may be formed from different materials than those described in relation to the above embodiment. Other suitable materials may be: brass; aluminium; copper; or suitable alloys.

Further, the first and second sections of the protection structure need not be formed from the same material.

Dissimilar materials having different thicknesses or hardnesses may be used to provide the necessary deformability of the first section relative to the second section.

The protection structure need not have the specific shape described. Cross-sectional shapes other than circular may be used; for example, square, oval or polygonal. In addition, the relative dimensions and proportions may be varied as appropriate to maintain the desired material and functional properties.

In addition, whilst the second section is, in the described embodiment, shown to compress and buckle, other types of deformation mechanism are to be considered to be within the scope of the present invention. For example, the first section may be arranged to peel away from the second section which is deformed as a result.

In addition, either the first or second sections may comprise an initiator or initiators to encourage particular deformation. For example, a shaped aperture, or particular section of material may be thinned to provide an engineered weak point around which deformation and/or fracture may be centred.

The guard structure may differ from that shown and described without departing from the scope of the present invention. For example, the dependent lip need not extend around the entire circumference of the guard. In addition, alternative materials and structures may be used as appropriate.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A protection structure for a gas cylinder assembly comprising a gas cylinder body and a valve, the gas cylinder body including a base and a neck to which a proximal end of the valve is connected in use, the valve having a housing, an outlet, an integrated pressure regulator, a fill port, and a distal end remote from the gas cylinder body that forms a top surface of the gas cylinder assembly, the protection structure comprising:
 a first hollow section having a closed lower end connectable to the top surface of the gas cylinder assembly at the distal end of the valve and extending further distal from the cylinder body, the first hollow section having an open upper end;
 a second hollow section arranged in a stacked configuration on the first section such that the second section is further distal from the gas cylinder body than the first section and is spaced from the valve by the first section, the second hollow section having an open lower end connected directly to and in contact with the open upper end of the first hollow section and an upper open end distal from the first hollow section,
 wherein, in use, the second section is arranged to transfer impact forces to the first section, and the first section is arranged to deform with respect to the second section in response to said impact forces to reduce the peak impact force on the valve.

2. A protection structure according to claim 1, wherein first section comprises a tapered section.

3. A protection structure according to claim 1, wherein the second section is substantially cylindrical.

4. A protection structure according to claim 1, wherein the first and second sections are connected by mating flanges.

5. A protection structure according to claim 1, wherein at least one of the first and second sections is formed from mild steel.

6. A protection structure according to claim 1, wherein the second section is formed from a thicker or harder material than the first section.

7. A protection structure according to claim 6, wherein the second section is formed from thicker material than the first section, the material having a yield stress in the range of 100-250 MPa.

8. The protection structure of claim 1, further comprising a guard body that is arranged, in use, to surround the valve and protection structure, at least a portion of the guard body being supported by the protection structure.

9. A protection structure according to claim 8, wherein the guard body comprises first and second clamshell portions arranged to connect directly to the protection structure.

10. A protection structure according to claim 8, wherein the guard body is formed from a plastics material.

11. A valve assembly comprising a proximal end connectable to a gas cylinder and a distal end comprising a protection structure according to claim 1.

12. A valve assembly according to claim 11, wherein the protection structure is connected to the distal end of the valve assembly by removable or permanent fixings.

13. A gas cylinder assembly comprising a gas cylinder body and a valve assembly according to claim 11.

14. A valve assembly of claim 11, further comprising a guard body that is arranged, in use, to surround the valve and protection structure, at least a portion of the guard body being supported by the protection structure.

15. A valve assembly according to claim 14, wherein the guard body comprises first and second clamshell portions arranged to connect directly to the protection structure.

16. A gas cylinder assembly according to claim 13, wherein the valve assembly further comprises a guard body that is arranged, in use, to surround the valve and protection structure, at least a portion of the guard body being supported by the protection structure.

17. A gas cylinder assembly according to claim 16, wherein the guard body comprises first and second clamshell portions arranged to connect directly to the protection structure.

* * * * *